United States Patent
Gray et al.

(10) Patent No.: US 10,451,347 B2
(45) Date of Patent: Oct. 22, 2019

(54) CONDENSATION-CONTROLLING INSULATION SYSTEM AND METHOD

(71) Applicant: The Boeing Company, Chicago, IL (US)

(72) Inventors: John C. Gray, Merritt Island, FL (US); Daniel F. Reynolds, Houston, TX (US)

(73) Assignee: THE BOEING COMPANY, Chicago, IL (US)

(*) Notice: Subject to any disclaimer, the term of this patent is extended or adjusted under 35 U.S.C. 154(b) by 515 days.

(21) Appl. No.: 15/189,613

(22) Filed: Jun. 22, 2016

(65) Prior Publication Data
US 2017/0370643 A1    Dec. 28, 2017

(51) Int. Cl.
| | |
|---|---|
| *F26B 5/04* | (2006.01) |
| *F26B 5/16* | (2006.01) |
| *B64C 1/06* | (2006.01) |
| *B64C 1/40* | (2006.01) |
| *B64G 1/58* | (2006.01) |
| *F16L 59/02* | (2006.01) |

(52) U.S. Cl.
CPC ............. *F26B 5/16* (2013.01); *B64C 1/067* (2013.01); *B64C 1/40* (2013.01); *B64G 1/58* (2013.01); *F16L 59/029* (2013.01)

(58) Field of Classification Search
CPC ............. F26B 5/16; F28F 13/00; F25D 23/06
USPC ...... 34/416, 71, 329, 332, 95; 165/136, 135; 62/451
See application file for complete search history.

(56) References Cited

U.S. PATENT DOCUMENTS

| | | | |
|---|---|---|---|
| 5,035,445 A * | 7/1991 | Poulin ............. | B60S 9/06 188/5 |
| 5,441,083 A | 8/1995 | Korsgaard | |
| 5,520,009 A | 5/1996 | Jepsen et al. | |
| 6,026,863 A | 2/2000 | Korsgaard | |
| 7,308,803 B2 * | 12/2007 | Brokaw ............. | F16L 59/141 138/149 |
| 2012/0305706 A1 * | 12/2012 | Weston ............. | B64C 1/40 244/119 |
| 2013/0344762 A1 | 12/2013 | Vermont et al. | |

FOREIGN PATENT DOCUMENTS

WO    WO1991018237 A1    11/1991

OTHER PUBLICATIONS

European Patent Office; Extended European Search Report; European Patent Application No. 17169527.3 dated Oct. 26, 2017.

* cited by examiner

*Primary Examiner* — John P McCormack
(74) *Attorney, Agent, or Firm* — Parsons Behle & Latimer

(57) ABSTRACT

A condensation-controlling insulation system includes an interior insulation layer for application to a cold surface. The system may further include an exterior absorption layer adapted to retain condensation during a first environmental condition and to release the condensation as a vapor during a second environmental condition.

19 Claims, 6 Drawing Sheets

CONDENSATION-CONTROLLING INSULATION SYSTEM AND METHOD

GOVERNMENT LICENSE RIGHTS

This invention was made with Government support under NNK14MA75C awarded by NASA. The government has certain rights in the invention.

FIELD OF THE DISCLOSURE

This disclosure relates generally to the field of condensation-controlling insulation and more particularly to a condensation-controlling insulation system and method for use in a spacecraft or other environmentally controlled volume.

BACKGROUND

Advancements in air and space travel have resulted in the expansion of requirements for systems used while also resulting in increasingly limited space. Typically, systems associated with air and space crafts, such as active thermal control systems and navigation systems, may be tightly packed into a small environmentally controlled volume, such as an avionics bay. As the systems are designed to be in closer proximity, the possibility of interference between the systems increases. A significant source of interference may occur due to condensation that may form on cool surfaces, such as a coolant tube of an active thermal control unit. The condensation may potentially come into contact with water-sensitive equipment, such as electrical circuitry, thereby causing it to malfunction.

In order to prevent condensation from forming, a thick layer (e.g., up to 8 inches) of insulation may be applied to cool surfaces. The thick layer of insulation may protect against condensation during exposure to a wide range of environmental conditions associated with air and/or space travel. However, due to space limitations thick layers of insulation may not always be practical. Other disadvantages may exist.

SUMMARY

Disclosed are systems and methods that overcome at least some of the shortcomings described with reference to typical insulation systems. Rather than prevent condensation from forming during each anticipated environmental condition, an exterior absorption layer of an insulation system can be used to absorb and retain condensation during limited exposures to condensation-producing environments. An interior insulation layer may be used to prevent condensation from forming during less extreme environmental conditions. The outer absorption layer may prevent water from coming in contact with water sensitive instrumentation during the exposure to the condensation-producing environment. After the condensation-producing environment has passed, the retained condensation may evaporate into a surrounding environment.

In an embodiment, a condensation-controlling insulation system includes an interior insulation layer for application to a cold surface. The system further includes an exterior absorption layer adapted to retain condensation during a first environmental condition and to release the condensation as a vapor during a second environmental condition.

In some embodiments, a thickness of the interior insulation layer is selected to permit the temperature of an outer surface of the interior insulation layer to fall below a first threshold during the first environmental condition and to cause the temperature of the outer surface of the interior insulation layer to exceed a second threshold during a second environmental condition. The first threshold may be a first dew point associated with the first environmental condition. The second threshold may be a second dew point associated with the second environmental condition. In some embodiments, the interior insulation layer includes a fiberglass insulation and a metal-foil vapor barrier. In some embodiments, the interior insulation layer includes a closed-cell neoprene rubber foam insulation and an integral vapor barrier. In some embodiments, a thickness of the exterior absorption layer is selected to retain a predetermined amount of condensation. In some embodiments, the exterior absorption layer includes a meta-aramid material felt. In some embodiments, the exterior absorption layer includes an open-cell neoprene rubber foam insulation. In some embodiments, the cold surface is part of a coolant container. The cold surface may be part of an active thermal control system coolant tube in an avionics bay. The avionics bay may be part of an aircraft, a spacecraft, or a combination of both.

In an embodiment, a method includes buffering, using an interior insulation layer, a cold surface from a surrounding environment. The method further includes retaining, using an exterior absorption layer, condensation during a first environmental condition. The method also includes releasing the condensation as a vapor during a second environmental condition.

In an embodiment, a method includes applying an interior insulation layer to a cold surface. The method further includes applying an exterior absorption layer to the interior insulation layer. The exterior absorption layer is adapted to retain condensation during a first environmental condition and to release the condensation as a vapor during a second environmental condition.

In some embodiments, the method further includes selecting a thickness of the interior insulation layer based on a temperature of the cold surface to permit a temperature of an outer surface of the interior insulation layer to fall below a first threshold during the first environmental condition and to cause the temperature of the outer surface of the interior insulation layer to exceed a second threshold during a second environmental condition. The method may also include forming the interior insulation layer based on the selected thickness. In some embodiments, applying the interior insulation layer includes applying an insulating material to the cold surface and applying a vapor barrier to the insulating material. In some embodiments, the method includes selecting a thickness of the exterior absorption layer to retain a predetermined amount of condensation and forming the exterior absorption layer based on the selected thickness.

Figure 1:
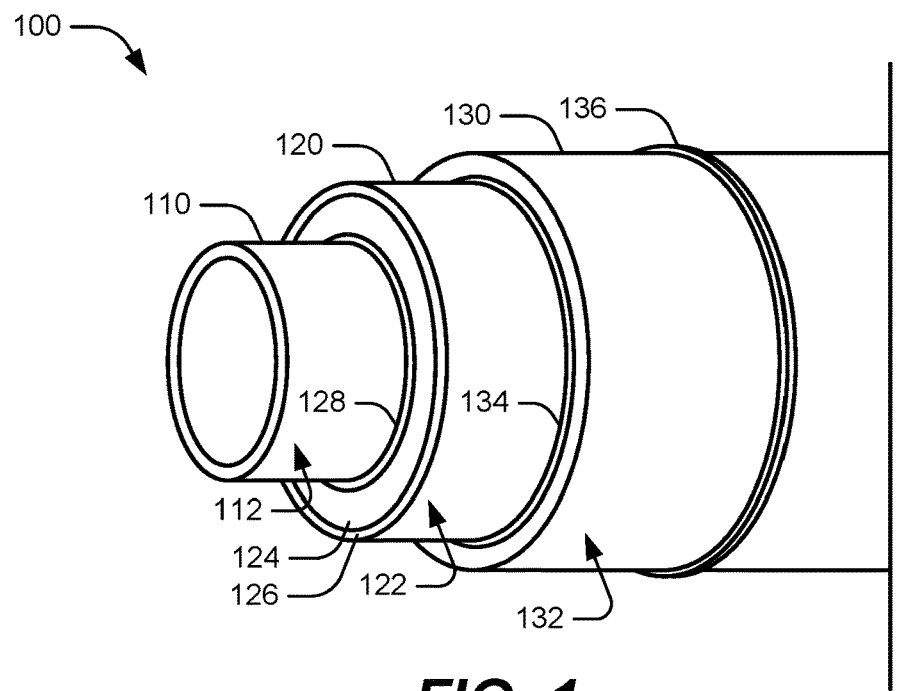
FIG. 1 is a perspective representation depicting an embodiment of a condensation-controlling insulation system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as recited in the appended claims.

DETAILED DESCRIPTION

Figure 2:
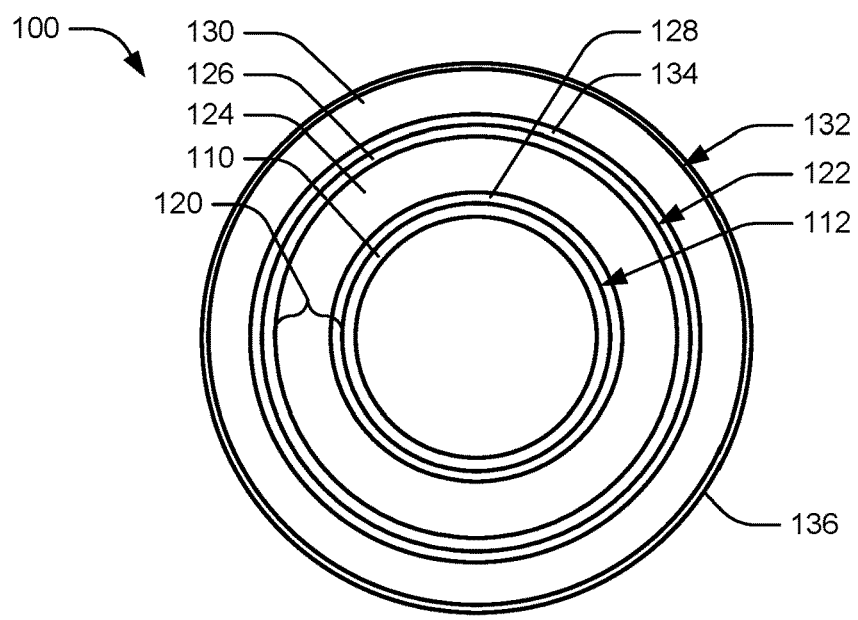
FIG. 2 is a cross-section representation depicting the embodiment of the condensation-controlling insulation system.

Referring to FIGS. 1 and 2, an embodiment of a condensation-controlling insulation system is depicted and generally designated 100. FIG. 1 depicts a perspective view of the system 100 and FIG. 2 depicts a cross-section of the system 100. In some embodiments, the system 100 may include, or be applied to, a coolant tube 110 or another type of cold volume. The system 100 may include an interior insulation layer 120 and an exterior absorption layer 130.

The coolant tube 110 may have a cold surface 112. As used herein, a cold surface is a surface of a cold volume (e.g., the coolant tube 110), both of which have temperatures that are colder than a surrounding environment. In some embodiments, the coolant tube 110 may have temperatures of about −85° C. Further, although FIGS. 1 and 2 depict the coolant tube 110 as having a cylindrical shape, in other embodiments, the coolant tube 110, and the corresponding cold surface 112 may have other shapes and/or sizes as would be appreciated by one of ordinary skill in the art having the benefit of this disclosure. For example, in some embodiments, the coolant tube 110 is in the form of a duct, a box, a panel, or another type of volume. The cold surface 112 may be a surface of the duct, the box, the panel, or the other type of volume.

The interior insulation layer 120 may be attached to the cold surface 112 as an insulating buffer between the cold surface 112 and a surrounding environment. As such, an outer surface 122 of the interior insulation layer 120 may have a higher temperature than the cold surface 112. The higher temperature of the outer surface 122 of the interior insulation layer 120 may be sufficient to prevent condensation at the outer surface 122 of the interior insulation layer 120 while being subjected to some environmental conditions, as described herein. An adhesive 128 may be used to attach the interior insulation layer 120 to the coolant tube 110. The adhesive 128 may include a foam adhesive or another type of adhesive capable of attaching the interior insulation layer 120.

The interior insulation layer 120 may include both an insulation layer 124 and a vapor barrier 126. The insulation layer 120 may include materials that resist heat transfer from the cold surface 112 to the surrounding environment. The materials may include a fiberglass insulation, a closed-cell neoprene rubber foam insulation, another type of insulation, or a combination thereof. As a non-limiting example, the materials may include an Armaflex® insulation. In other embodiments, another type of insulation material may be used.

The vapor barrier 126 may enclose the insulation layer 120 to prevent humidity from the surrounding environment from coming into contact with, or otherwise being absorbed by the insulation layer 124. Without the vapor barrier 126, condensation may occur within the insulation layer 120 causing degradation or other damage thereto. The vapor barrier 126 may include a metal-foil vapor barrier, an integral vapor barrier (as in the case of a closed-cell neoprene rubber foam insulation), another type of vapor blocking barrier, or a combination thereof. Further, although FIGS. 1 and 2 depict the interior insulation layer 120 as including both the insulation layer 124 and the vapor barrier 126, in some embodiments, the vapor barrier 126 may be omitted. Also, in some embodiments additional layers (not shown) may be included within the interior insulation layer 120.

In order to remove moisture that my accumulate within insulation layers in general, some typical insulation systems may include openings or slots that enable the flow of moisture from within a typical inner insulation layer to an external layer (e.g., through capillary action). In these typical systems, the moisture may then be evaporated from the exterior layer. In contrast to typical insulation systems, with regard to the embodiments disclosed herein, the interior insulation layer 120 may be fully encapsulating, excluding openings that enable the flow of moisture between the interior insulation layer 120 and the exterior absorption layer 130. As such, the interior insulation layer 120 may be protected from condensation that accumulates within the exterior absorption layer 130.

The exterior absorption layer 130 may be attached to the interior insulation layer 120. An outer surface 132 of the exterior absorption layer 130 may be adapted to absorb condensation when it forms, retaining it within the exterior absorption layer 130. Further, the exterior absorption layer 130 may be adapted to enable the condensation to evaporate from the exterior absorption layer 130. In some embodiments, the exterior absorption layer 130 includes a meta-aramid material felt. For example, the exterior absorption layer 130 may include a Nomex® felt. In some embodiments, the exterior absorption layer 130 may include others type of absorbent material. The exterior absorption layer 130 may be attached to the interior insulation layer using an adhesive 134. In order to further secure the exterior absorption layer 130, one or more tie wraps 136 may be applied to the system 100. In some embodiments, the tie wraps 130 may be spaced evenly along the length of the system 100.

During operation, the system 100 may be subjected to varying environmental conditions. For example, sometimes the system 100 may be temporarily subjected to a first set of environmental conditions. The first set of environmental conditions may be estimated based on an anticipated application of the system 100, and the system 100 may be designed accordingly. For example, a thickness of the interior insulation layer 120 may be selected based on predetermined environmental conditions. Properties associated with the first set of environmental conditions may include particular levels of humidity and corresponding dew point temperatures.

During exposure to the first environmental conditions, the interior insulation layer 120 may permit the formation of condensation. For example, the interior insulation layer 120 may too thin to enable the temperature at the outer surface 122 of the interior insulation layer 120 to exceed the dew point temperatures associated with the first environmental conditions. As condensation forms proximate to the outer surface 122 of the interior insulation layer 120, the exterior absorption layer 130 may absorb and retain the condensation. As such, the exterior absorbent layer 130 may prevent free standing water from accumulating on the outer surface 132 of the exterior absorption layer 130, thereby protecting any nearby water-sensitive equipment.

For the majority of its operational lifespan the system 100 may be subjected to a second set of environmental conditions or ranges of conditions. Properties associated with the second set of environmental conditions may include relatively low levels of humidity and corresponding low dew point temperatures as compared to the first set of environmental conditions. During the second set of environmental conditions, the interior insulation layer 120 may be sufficiently thick to prevent condensation from forming on the outer surface 122 of the interior insulation layer 120. For example, a temperature of the outer surface 122 may be greater than a dew point temperature associated with the second set of environmental conditions. Further, during the second set of environmental conditions, the condensation retained by the exterior absorbent layer 130 may be permitted to evaporate into the surrounding environment. Thus, the system 100 may be designed to temporarily withstand condensation-producing environmental conditions.

A benefit of the system 100 is that a total thickness of the interior insulation layer 120 and the exterior absorption layer 130 may be reduced as compared to a thickness of an insulation layer of a typical insulation system, while still preventing free standing condensation. Other benefits and advantages of the system 100 may be apparent to persons of ordinary skill in the relevant art having the benefit of this disclosure.

Figure 3:
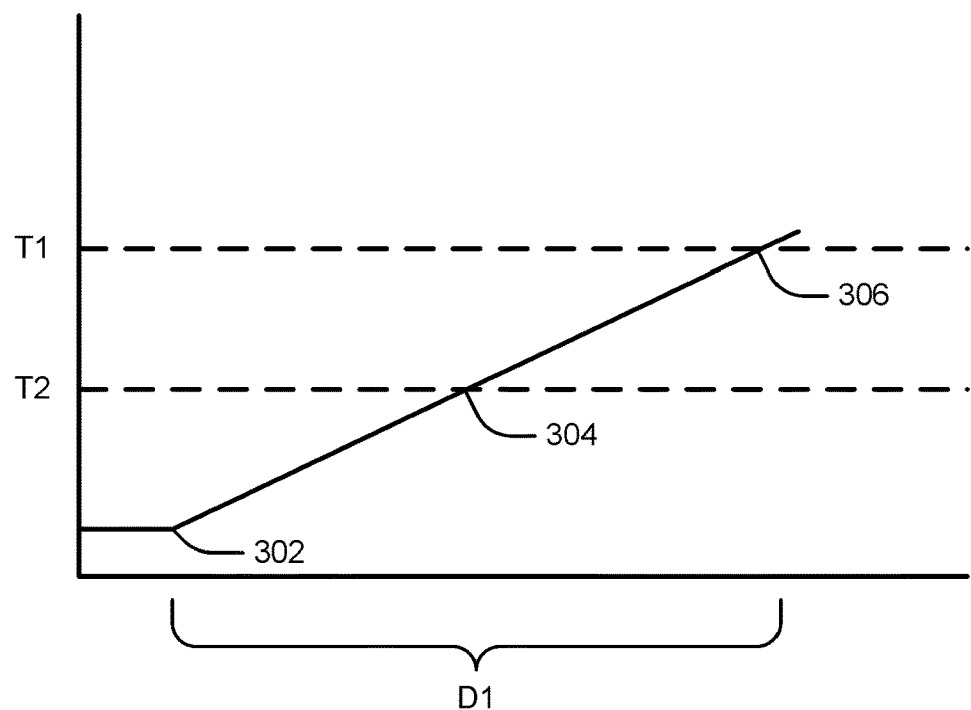
FIG. 3 is a plot depicting temperatures within a condensation-controlling insulation system having an insulation layer with a first thickness.

FIG. 3 is a plot depicting temperatures within a typical insulation system. The temperatures are depicted as a function of position within the system. For example, the horizontal axis of FIG. 3 may correspond to a distance from the center of a typical insulation system. The vertical axis may correspond to the temperature of a cold volume and of an insulation layer at each of the positions. As depicted in the plot, at the left-hand side, the temperatures may be low and generally constant within the cold volume. At the point 302, where the cold volume adjoins the insulation layer, the temperature may begin to increases proportionally to the distance from the cold volume within the insulation layer. FIG. 3 may correspond to typical insulation systems that are designed to prevent condensation from forming in each of the contemplated environmental condition in which the insulation system may operate.

In FIG. 3, horizontal dotted lines mark a first temperature threshold T1 and a second temperature threshold T2. The first temperature threshold T1 may correspond to a dew point of a first environmental condition. The second temperature threshold T2 may correspond to a dew point of a second environmental condition. In order to prevent the formation of condensation on a surface of the insulation during both environmental conditions, the insulation layer may be sufficiently thick to ensure that a temperature at the surface of the insulation layer (represented at the right-hand edge of the plot furthest from the vertical axis) exceeds both of the temperature thresholds T1 and T2. As depicted in FIG. 3, the insulation may have a thickness D1 that causes the temperature within the insulation to exceed the second temperature threshold at a point 304 and to exceed the first temperature threshold at a point 306. However, the thickness D1 may be too thick for some applications, such as within an avionics bay where space is generally limited.

Figure 4:
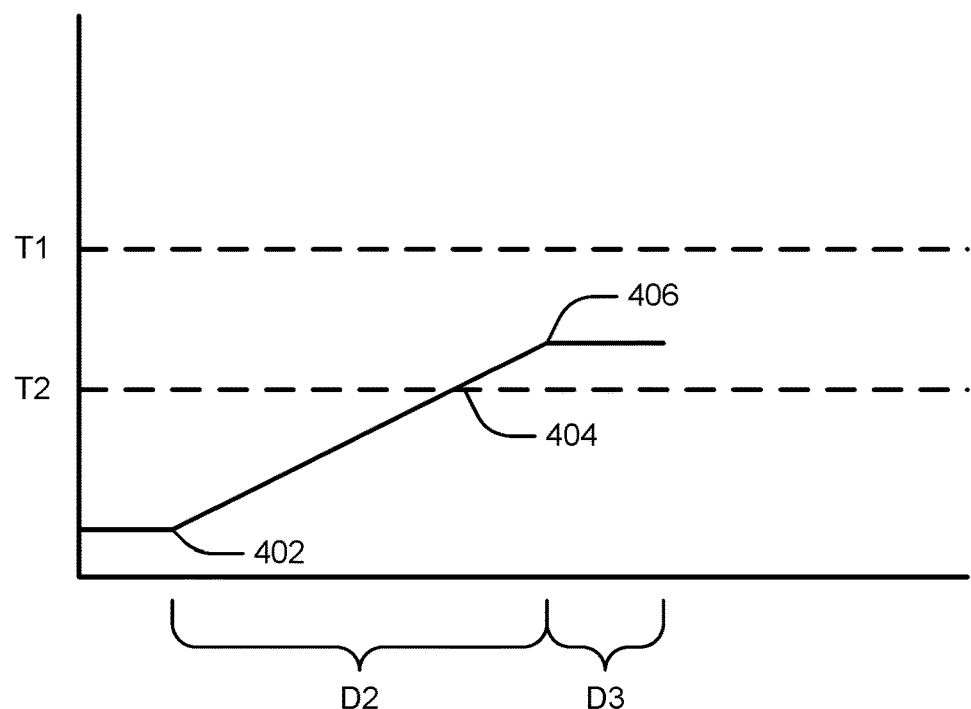
FIG. 4 is a plot depicting temperatures within a condensation-controlling insulation system having an insulation layer with a second thickness.

FIG. 4 is a plot depicting temperatures within an insulation system as described herein. For example, the insulation system of FIG. 4 may correspond to the insulation system 100. The horizontal axis of FIG. 4 may correspond to a distance from the center of the insulation system 100. The vertical axis may correspond to a temperature of within the coolant tube 110, within the interior insulation layer 120, and within the exterior absorption layer 130. As depicted, the temperature may be low and generally constant within the coolant tube 110. At the point 402, where the coolant tube 110 adjoins the interior insulation layer 120, the temperature may increase proportionally to the distance from the coolant tube 110. At the point 404, the temperature may exceed the second temperature threshold T2. At the point 406, where the interior insulation layer 120 meets the exterior absorption layer 130, the temperatures may again become constant through the exterior absorption layer 130. In some embodiments, the temperature may further increase through the exterior absorption layer 130, depending on the type of absorption material used and its associated insulation properties.

As depicted in FIG. 4, the interior insulation layer 120 may have a thickness D2 that causes the temperature within the interior insulation layer 120 to exceed the second temperature threshold T2 at a point 404. However, the thickness D2 may not be sufficient to enable the temperature within the interior insulation layer 120 to exceed the first temperature threshold T1. Thus, while subjected to the first environmental condition, condensation may occur proximate to the interior insulation layer 120. The condensation may be absorbed by the exterior absorptions layer 130.

The first environmental condition may be associated with transient, short-term conditions, such as high humidity and/or air pressure. The thickness D3 of the exterior absorption layer 130 may be selected based on an estimated or predetermined amount of time associated with the transient, short-term conditions to ensure that the exterior absorption layer 130 has the capacity to retain the amount of condensation formed. The second environmental condition may be associated with long-term conditions. During the long-term conditions, the thickness D2 of the insulation layer may be sufficient to prevent condensation. The thickness D2 may be selected based on an estimated or predetermined dew point associated with the second environmental conditions and based on a temperature of the coolant tube 110. During the second environmental conditions, any condensation that is already retained by the absorption layer may be released into the surrounding environment as vapor.

An advantage of the embodiment of the condensation-controlling system described by the plot in FIG. 4 is that the sum of the thickness D2 of the insulation layer and the thickness D3 of the absorption layer may be significantly smaller than the thickness D1 of a typical insulation system, as described with reference to FIG. 3. As such, space may be saved while preventing condensation from forming and from possibly coming into contact with surrounding equipment that may be water-sensitive. Other benefits and advantages may be apparent to persons of ordinary skill in the art having the benefit of this disclosure.

Figure 5:
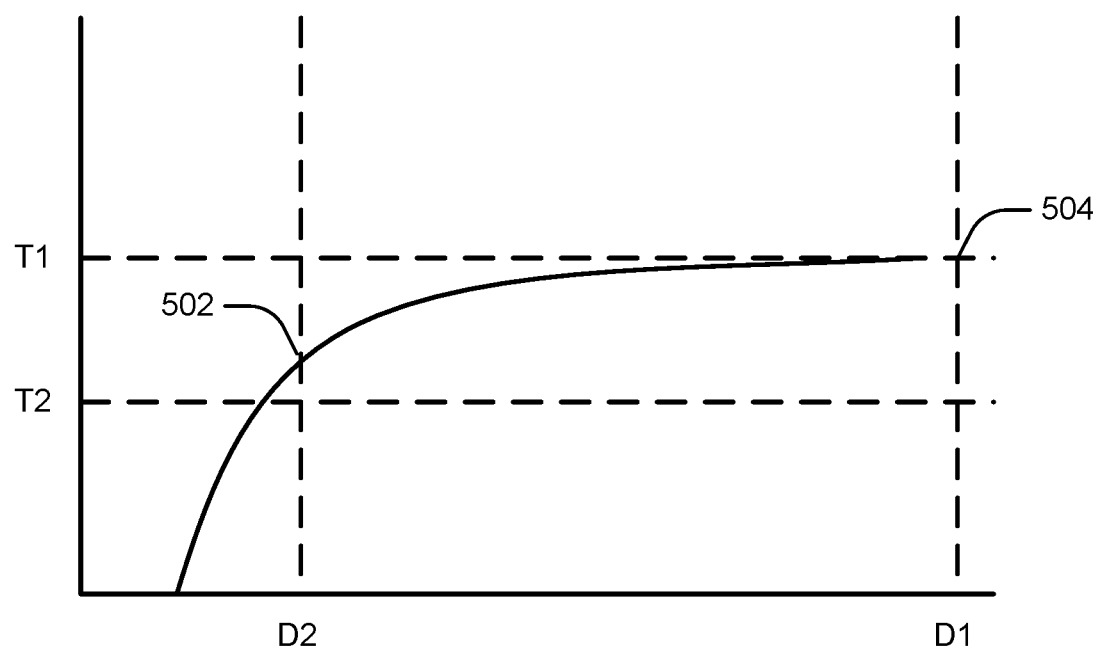
FIG. 5 is a plot depicting temperatures of an outer surface of an insulation layer as a function of thicknesses of the sample.

FIG. 5 is a plot depicting temperatures of an outer surface of a sample of insulation as a function of thicknesses of the sample. The horizontal axis corresponds to different thicknesses of the insulation. The vertical axis corresponds to temperatures at an outer surface of the insulation. The vertical dotted lines depict a thickness D1 that may be associated with an outer surface of typical insulation systems and a thickness D2 that may be associated with the outer surface 122 of the interior insulation layer 120 of the system 100. The horizontal dotted lines depict a first temperature threshold T1 associated with a first environmental condition and a second temperature threshold T2 associated with a second environmental condition. At the point 502, it can be seen that the temperature at the outer surface 122 of the interior insulation layer 120 falls between the first threshold T1 and the second threshold T2. At the point 504, it can be seen that the temperature at an outer surface of a typical insulation system exceeds both the thresholds T1 and T2.

FIG. 5 illustrates diminishing returns with respect to the benefit of adding additional thickness to an insulation layer. Further, FIG. 5 highlights the significant benefit of using the exterior absorption layer 130 to collect and retain condensation during the first environmental condition instead of employing a thicker insulation layer to prevent the condensation from occurring. For example, the thickness D2 may be much less than the thickness D1.

Figure 6:
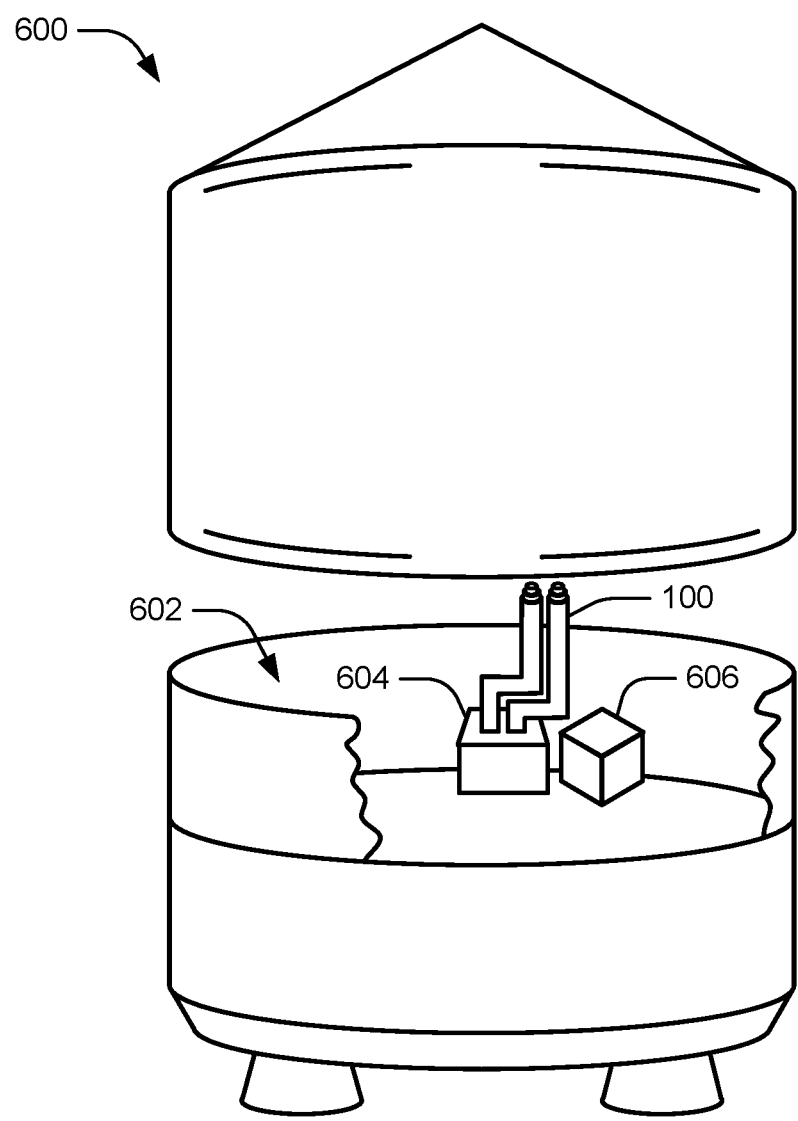
FIG. 6 is an exploded perspective representation depicting an embodiment of a spacecraft that includes a condensation-controlling insulation system.

FIG. 6 is an exploded perspective representation depicting an embodiment of a spacecraft 600 that includes the condensation-controlling insulation system 100. The spacecraft 600 may include an avionics bay 602. An active thermal control system 604 may be positioned within the avionics bay 602. The condensation-controlling insulation system 100 may be part of the active thermal control system 604. Although FIG. 6 depicts the avionics bay as corresponding to a spacecraft 600, the avionics bay may also correspond to other types of aircraft.

Additional water-sensitive equipment 606 may also be positioned within the avionics bay 602. By retaining condensation during a first environmental condition and by preventing condensation during a second environmental condition, the system 100 may prevent the condensation from contacting the water-sensitive equipment 606 thereby prevent it from being damaged or otherwise malfunctioning. Other benefits and advantages of the system 100 may be apparent to persons of ordinary skill in the relevant art having the benefit of this disclosure.

Figure 7:
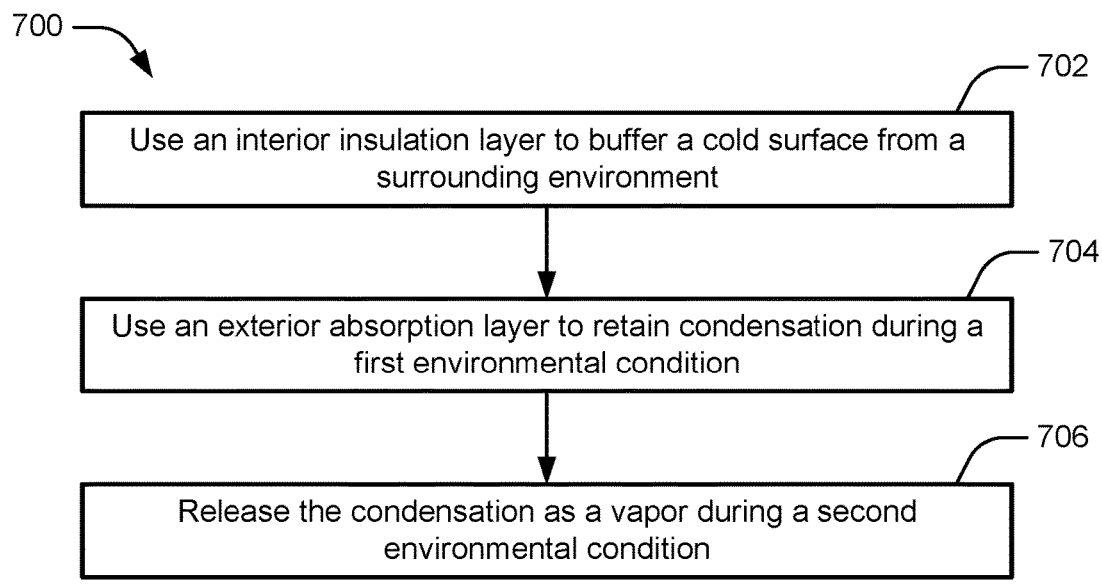
FIG. 7 is a flow chart depicting an embodiment of a method of condensation control performed by an embodiment of a condensation-controlling insulation system.

FIG. 7 is a flow chart depicting an embodiment of a method 700 of condensation control performed by an embodiment of a condensation-controlling insulation system. The method 700 may include using an interior insulation layer to buffer a cold surface from a surrounding environment, at 702. For example, the interior insulation layer 120 may buffer the surface 112 of the coolant tube 110 from a surrounding environment.

The method 700 may further include using an exterior absorption layer to retain condensation during a first environmental condition, at 704. For example, the exterior absorption layer 130 may retain condensation during a first environmental condition. The first environmental condition may result in a first dew point temperature that is greater than a temperature of the outer surface 122 of the insulation layer 120 as depicted with respect to the temperature T1 and the point 406 of FIG. 4.

The method 700 may also include releasing the condensation as a vapor during a second environmental condition, at 706. For example, the exterior absorption layer 130 may permit retained condensation to evaporate during a second environmental condition. The second environmental condition may result in a second dew point temperature that is less than a temperature of the outer surface 122 of the insulation layer 120 as depicted with respect to the temperature T2 and the point 406 of FIG. 4.

A benefit and advantage of the method 700 is that the capabilities of interior insulation layer may be augmented by the exterior absorption layer to prevent the formation of condensation and to retain condensation that may form in order to prevent the condensation from coming into contact with electrically sensitive equipment. The method 700 may result in a significant size reduction of an insulation system. Other benefits and advantages of the method 700 may be apparent to persons of ordinary skill in the relevant art having the benefit of this disclosure.

Figure 8:
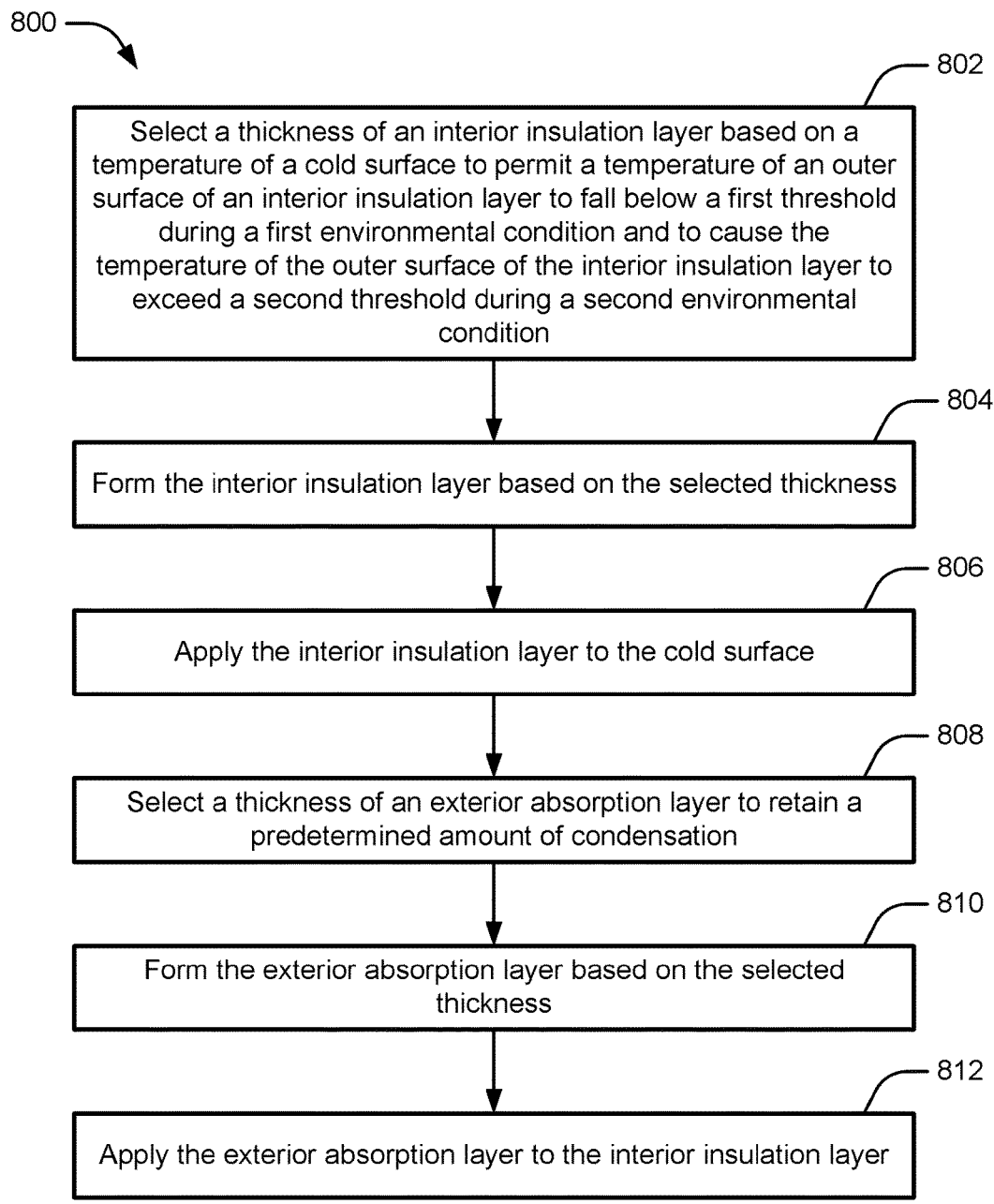
FIG. 8 is a flow chart depicting an embodiment of a method of forming a condensation-controlling insulation system.

FIG. 8 is a flow chart depicting an embodiment of a method 800 of forming a condensation-controlling insulation system. The method 800 may include selecting a thickness of an interior insulation layer based on a temperature of a cold surface to permit a temperature of an outer surface of an interior insulation layer to fall below a first threshold during a first environmental condition and to cause the temperature of the outer surface of the interior insulation layer to exceed a second threshold during a second environmental condition, at 802. For example, the thickness D2 of FIG. 4 may be selected based on a temperature of an outer surface 112 of the coolant tube 110 to permit a temperature of the outer surface 122 of the interior insulation layer 120 to fall below the dew point T1 associated with a first environmental condition and to cause the temperature of the outer surface 122 of the interior insulation layer 120 to exceed the dew point T2 associated with a second environmental condition.

The method 800 may further include forming the interior insulation layer based on the selected thickness, at 804. For example, the interior insulation layer 120 may be formed having a thickness that corresponds to D2 of FIG. 4.

The method 800 may also include applying the interior insulation layer to the cold surface, at 806. For example, the interior insulation layer 120 may be applied to the outer surface 112 of the coolant tube 110 using the adhesive 128.

The method 800 may include selecting a thickness of an exterior absorption layer to retain a predetermined amount of condensation, at 808. For example, the thickness D3 of FIG. 4 may be selected to enable the exterior absorption layer 130 to retain a predetermined amount of condensation. The predetermined amount of condensation may be based on an estimated exposure time to the first environmental conditions.

The method 800 may further include forming the exterior absorption layer based on the selected thickness, at 810. For example, the exterior absorption layer 130 may be formed having a thickness that corresponds to D3 of FIG. 4.

The method 800 may also include applying the exterior absorption layer to the interior insulation layer, at 812. For example, the exterior absorption layer 130 may be applied to the interior insulation layer 120 using the adhesive 134. In some embodiments, the surface 122 of the interior insulation layer 120 may be cleaned with a solvent before the application of the exterior absorption layer 130. Further, in some embodiments, the exterior absorption layer may be applied in pre-cut strips. A tie wrap, e.g., the tie wrap 136, may also be used to secure the exterior absorption layer 130.

A benefit and advantage of the method 800 is that an insulation system may be formed with augmented capabilities as compared to typical insulation systems. For example, the method 800 may result in a significant size reduction of the insulation system as compared to typical methods of forming insulation systems while still preventing condensation from coming into contact with water-sensitive equipment. Other benefits and advantages of the method 800 may be apparent to persons of ordinary skill in the relevant art having the benefit of this disclosure.

Although various embodiments have been shown and described, the present disclosure is not so limited and will be understood to include all such modifications and variations are would be apparent to one skilled in the art.

What is claimed is:

1. A condensation-controlling insulation system comprising:
   an interior insulation layer for application to a cold surface; and
   an exterior absorption layer adapted to retain condensation during a first environmental condition and to release the condensation as a vapor during a second environmental condition, wherein the exterior absorption layer includes an absorbent open-cell neoprene rubber foam insulation.

2. The system of claim 1, wherein a thickness of the interior insulation layer is selected to permit a temperature of an outer surface of the interior insulation layer to fall below a first threshold during the first environmental condition and to cause the temperature of the outer surface of the interior insulation layer to exceed a second threshold during a second environmental condition.

3. The system of claim 2, wherein the first threshold is a first dew point associated with the first environmental condition, and wherein the second threshold is a second dew point associated with the second environmental condition.

4. The system of claim 1, wherein the interior insulation layer includes:
   a fiberglass insulation; and
   a metal-foil vapor barrier.

5. The system of claim 1, wherein the interior insulation layer includes:
   a closed-cell neoprene rubber foam insulation; and
   an integral vapor barrier.

6. The system of claim 1, wherein a thickness of the exterior absorption layer is selected to retain a predetermined amount of condensation.

7. The system of claim 1, wherein the exterior absorption layer includes a meta-aramid material felt.

8. The system of claim 1, wherein the cold surface is part of a coolant container.

9. The system of claim 1, wherein the cold surface is part of an active thermal control system coolant tube in an avionics bay that is part of an aircraft, a spacecraft, or a combination thereof.

10. The system of claim 1, wherein the interior insulation layer excludes openings that enable the flow of moisture between the inner insulation layer and the exterior absorption layer.

11. A method comprising:
   subjecting an insulated cold surface to a first environmental condition having a first level of humidity and a first air pressure;
   using an interior insulation layer to buffer the insulated cold surface from the first environmental condition;
   using an exterior absorption layer to retain condensation during the first environmental condition;
   subjecting the insulated cold surface to a second environmental condition having a second level of humidity lower than the first level of humidity and a second air pressure lower than the first air pressure; and
   releasing the condensation as a vapor during the second environmental condition.

12. The method of claim 11, wherein a thickness of the interior insulation layer is selected to permit a temperature of an outer surface of the interior insulation layer to fall below a first threshold during the first environmental condition and to cause the temperature of the outer surface of the interior insulation layer to exceed a second threshold during the second environmental condition.

13. The method of claim 12, wherein the first threshold is a first dew point associated with the first environmental condition, and wherein the second threshold is a second dew point associated with the second environmental condition.

14. The method of claim 11, further comprising:
   estimating an amount of time of exposure to the first environmental condition; and
   selecting a thickness of the exterior absorption layer to retain a predetermined amount of condensation associated with the estimated amount of time of exposure to the first environmental condition.

15. A method comprising:
   estimating an amount of time of exposure of a cold surface to a first environmental condition;
   selecting a thickness of an exterior absorption layer to retain a predetermined amount of condensation based on the amount of time of exposure;
   applying an interior insulation layer to the cold surface; and
   applying the exterior absorption layer to the interior insulation layer, wherein the exterior absorption layer is adapted to retain condensation during the first environmental condition and to release the condensation as a vapor during the second environmental condition.

16. The method of claim 15, further comprising:
   selecting a thickness of the interior insulation layer based on a temperature of the cold surface to permit a temperature of an outer surface of the interior insulation layer to fall below a first threshold during the first environmental condition and to cause the temperature of the outer surface of the interior insulation layer to exceed a second threshold during a second environmental condition; and
   forming the interior insulation layer based on the selected thickness.

17. The method of claim 16, wherein the first threshold is a first dew point associated with the first environmental condition, and wherein the second threshold is a second dew point associated with the second environmental condition.

18. The method of claim 15, wherein applying the interior insulation layer further comprises:
   applying an insulating material to the cold surface; and
   applying a vapor barrier to the insulating material.

19. The method of claim 15, further comprising:
   forming the exterior absorption layer based on the selected thickness.

* * * * *